United States Patent
Fornera et al.

[11] Patent Number: 5,922,187
[45] Date of Patent: Jul. 13, 1999

[54] METHOD FOR CONTROLLING AN ELECTROEROSION MACHINE

[75] Inventors: Linda Fornera, Zurich; Lars Olsson, Intragna, both of Switzerland

[73] Assignee: Agie SA, Losone, Switzerland

[21] Appl. No.: 08/818,387

[22] Filed: Mar. 14, 1997

Related U.S. Application Data

[30] Foreign Application Priority Data

Mar. 14, 1996 [DE] Germany .......................... 196 10 082

[51] Int. Cl.[6] ...................................................... B23H 7/00
[52] U.S. Cl. ........................................ 205/640; 219/69.17
[58] Field of Search ........................... 205/640; 219/69.17

[56] References Cited

U.S. PATENT DOCUMENTS 5,751,589   5/1998   Sato et al. ........................... 364/474.35

FOREIGN PATENT DOCUMENTS

| | | | |
|---|---|---|---|
| 0 505 570 | 5/1995 | European Pat. Off. | B23H 7/20 |
| 41 38 092 | 6/1992 | Germany . | |
| 4-122524 | 4/1992 | Japan | B23H 7/20 |
| 4-189422 | 7/1992 | Japan | B23H 7/20 |

OTHER PUBLICATIONS

Derwent Patent Abstract of DE 41 38 092 no data available.

*Primary Examiner*—Kathryn Gorgos
*Assistant Examiner*—Thomas H. Parsons
*Attorney, Agent, or Firm*—Darby & Darby

[57] ABSTRACT

The invention relates to a method for controlling an electroerosion machine wherein a control device is provided with technological parameter sets. These link one of a group of input parameters with suitable output parameters. The control device compares actual, current input parameters with groups of input parameters of these technological parameter sets. The control device then provides one or more technological parameter sets with groups of input parameters which are identical to or similar to the actual, current input parameters.

21 Claims, 2 Drawing Sheets

METHOD FOR CONTROLLING AN ELECTROEROSION MACHINE

BACKGROUND OF THE INVENTION

The present invention relates to a method for controlling an EDM (Electroerosion or Electric Discharge Machine) via a control device provided with technical parameter sets connecting one of a group of input parameters with suitable output parameters.

In principle, an EDM machine can be controlled in a variety of ways. For example, at least theoretically, any conceivable type of electric pulse may be used. In addition, the manner in which the wire is controlled, such as the wire feed speed along the longitudinal direction of the wire, the wire tension, etc., may in principle be varied arbitrarily. The same applies to the other required control parameters, like flushing data.

Conversely, a preferred machining objective can in general be attained only by selecting a limited number out of all possible control parameters. The problem here is to select the ideal control parameters for a specific objective. This can be accomplished, but requires a great deal of experience and experimentation.

For this reason, modern EDM machines and their control devices, respectively, are provided with a number of available technical parameter sets including input parameter sets and output parameter sets, respectively. Input parameters, for example, may be machining objectives, workpiece and wire materials and the like. The output parameters comprise control parameters suitable for the respective input parameters. Consequently, a technical parameter set connects certain objectives with a suitable selection of control parameters.

DE 41 38 092 A1 discloses an example for a control method, e.g. for a sinker erosion machine, operating with technical parameter sets stored in memory. The input parameters, however, are purposely selected as "fuzzy", meaning in the form of parameter ranges, wherein the controller pre-selects from the parameter ranges specific input parameters which provide the best results with respect to machining time. For the pre-selected input parameters, certain output parameters are subsequently fetched from the stored technical parameter sets. It is presumed that respective technical parameter sets for all values from the input parameter ranges are available in the controller.

In reality, however, the number of technical parameter sets provided on the EDM machine is limited. An example for this limitation is the input parameter "workpiece height." A particularly thin workpiece may be machined with different electric pulses than a particularly thick workpiece. For establishing the respective technical parameter sets, it is not feasible to consider all conceivable workpiece heights. It is more convenient to restrict the height to a certain number of discrete values within a relevant range. It would be possible to have, for example, a technical parameter set for a workpiece height of 10 mm, another set for a height of 20 mm and another set for a height of 30 mm, each set for otherwise identical input parameters.

Frequently, however, the height of an actual workpiece to be machined lies between these discrete values, i.e. at about 25 mm. Similar arguments apply to the other input parameters.

In practical situations, for machining a workpiece, it is therefore usually desirable to select a technical parameter set which, although not ideal for the desired objective, is still adequate. In a machining operation with conventional technology, this is achieved in the following manner.

First, the control device indicates which values or possibilities, respectively, are present for a first input parameter in the available technical parameter sets. This may, for example, be the height of the workpiece to be machined. The user can now select one of these options. In the example, the user selects a workpiece height of 20 mm.

This selection, however, is not obvious if the actual workpiece height is 25 mm. It is, for example, conceivable that for an actually used EDM machine, values are preferably rounded up when the workpiece is thicker, and rounded down, when the workpiece is thinner. It is also conceivable that this rule is reversed for certain other input parameters. In addition, such a rule may depend on the material used for the wire and/or workpiece.

In a second step, the control device now displays all other available possibilities for a second input parameter. After a height of 20 mm was selected in the first step, the control device may now display all contour tolerances having associated with them technical parameter sets adapted for machining these tolerances at a workpiece height of 20 mm. Here again, the user has to make a selection.

The remaining input parameters are treated in the same manner. The control device then displays the remaining possibilities for each of these input parameters. After each option, the user makes a selection, whereby the number of possibilities for the next input parameter is reduced. Since technical parameter sets having exactly identical input parameters, but different output parameters are not permitted, exactly one technical parameter set is selected in this fashion.

If the procedure reflecting the present state of the art is represented in form of a diagram (FIG. 3), then the procedure corresponds to a hierarchical flow chart. In the example, there is a choice between three possibilities A, B and C at the starting point. Each of these possibilities A, B and C in turn represents a node where a selection can be made between the possibilities AI, AII and AIII, or between BI, BII and BIII. This procedure is repeated until an end point is reached.

The major disadvantage of this procedure is that the user has to make a decision at each of the nodes. As noted above, the user is required to have considerable technical know-how. In the end, the user has to know which of the available input parameters is best for providing the desired objectives. Consequently, the experience of a particular technical specialist is material for the efficiency of an EDM machine.

SUMMARY OF THE INVENTION

It is the object of the present invention to provide an improved method for controlling an EDM machine via technical parameter sets.

This is obtained by providing a method for controlling an EDM machine, wherein a control device comprises technological parameter sets, the control device compares individual current input parameters with (input) parameters of similar types taken from groups of input parameters of the technological parameter sets for determining the degree of similarity therebetween. Subsequently, the operator of the machine is provided with one or more technological parameter sets with groups of input parameters, for example, displayed on a display screen, which are the same as or similar to the current input parameters.

In this way, the machine operator is relieved of the responsibility to make a large number of separate decisions.

Instead, the control device compares all current input parameters, for example, a complete set, with all groups of input parameters present in the technological parameter sets. The user can also be provided with an overview over an arbitrary number of technological parameter sets which are more or less suited for the intended objectives. The final decision can then be made on the basis of a complete overview. In particular, the user can make a comparison between different technological parameter sets which come particularly close to the desired input parameters.

The groups of input parameters within the individual technological parameter sets preferably comprise the machine type, the workpiece material, the workpiece height, the wire material, the wire diameter, the desired roughness, the flank and/or the edge tolerance. The output parameters preferably include generator data, wire data and/or flushing data.

Technical parameter sets of this type are particularly suited for practical applications of the method of the invention and comprise all generally required parameters.

In one of the preferred embodiments of the method according to the invention, the control device assigns to each of the individual types of input parameters a respective scale, preferably a scale of values. In particular, the input parameter types machine type, workpiece material and/or wire material are assigned a linear scale and/or the input parameter types workpiece height, wire diameter, roughness, flank tolerance and/or the edge tolerance are assigned a logarithmic scale. The control device preferably places individual input parameters on the respective associated scale and compares input parameters of similar type based on their position on the respective associated common scale. Here, the control device determines, in particular, local distances on the respective associated scale, taking into account position-dependent weighting, if position-dependent weighting is provided. Such scaling allows the control device to compare, in a very effective manner, the current input parameters with input parameters taken from groups of input parameters of the technological parameter sets. Based on the type of scaling and/or through position-dependent weighting, all known rules for arriving at a decision when determining a local distance, can be taken into consideration. Furthermore, it is also possible to compare different types of input parameters by appropriate scaling.

Preferably, the control device determines local distances between any one of the current input parameters X and one input parameter Y of similar type out of a group of input parameters of one technological parameter set, using an associated linear scale, according to:

$$d_{local,lin}(X, Y) = abs[(X-Y)/(0.3 * X)] \text{ and/or}$$

$$d_{local,lin}(X, Y) = C_i = \text{constant and/or}$$

with an associated logarithmic scale according to $$d_{local,log}(X, Y) = abs[\log (X/Y)/\log (1.3)].$$

In such a described way, a position-dependent weighting is provided. With a linear scale, the local distance for a constant difference between X and Y becomes smaller when X becomes larger. Alternatively, a constant value may simply be used in this case. As a result, it is possible to employ the method of the invention even if, for example, different workpiece materials cannot be scaled. If, for example, in the operation of an EDM machine, a technological parameter set appropriate for copper is to be used for machining a workpiece made of a different material, then a constant local distance can be universally assigned to this deviation. In the case of a logarithmic scale, the relationship listed above is in agreement with experimental findings that, for example for the input parameter workpiece, identical (linearly determined) distances are less important for a larger total workpiece height than for a smaller total workpiece height.

Preferably, the control device determines local distances between any one of the current input parameters X and one input parameter interval [a, b] of similar type out of a group of input parameters of one technological parameter set according to:

$$d_{local,[a,b]}(X[a, b]) = 0 \text{ for } X \text{ inside the interval } [a, b]; \text{ and}$$

$$d_{local,[a, b]}(X(a, b)) = \min [d_{local,lin,log}(X,B)]$$

for X outside of [a, b].

As such, the above method is simply applied to input parameter intervals within the groups of input parameters of a technological parameter set. These intervals are useful when a technological parameter set, without significant alteration, is equally suited for the respective interval of an input parameter.

In another preferred embodiment, the control device compares a group of current input parameters $\{X_i\}$ with a group of input parameters of a technological parameter set $\{Y_i\}$ by determining a total distance $D_{total}$. Here, in particular, the control device combines all local distances of any one of the input parameters of the group of current input parameters with an input parameter of a similar type out of the group of input parameters of the technological parameter set. Preferably, all local distances are added together.

In an alternate preferred embodiment, the control device determines the total distance $D_{total}$ by weighting one or more of the local distances. The control device, in particular, multiplies the local distances with global weighting factors associated with the respective input parameter type and adds the resulting distances which are weighted and/or remain unweighted.

In this manner, the significance of individual input parameters can be considered in context. It may, for example, be important that a specific contour tolerance is achieved with great precision, whereas, for example, the type of wire employed is unimportant. There is also the possibility that because of higher cost or for keeping the inventory flexible, it is desired to use a particularly advantageous wire type, while a compromise can be made with respect to contour tolerances.

In the first event, a large weighting factor would be selected for the contour tolerance and a small weighting factor for the wire type. This would decide their relative importance when the total distance is determined. In the second case, just the opposite would hold.

In another preferred embodiment, the control device displays at least partly via a display device and other output means, respectively, a fixed number or a variable number of technological parameter sets having input parameters which come closest to the respective current input parameters.

This makes it particularly easy for the user to make a decision, since a total overview is provided. The user can, for example, contemplate if small losses in quality are acceptable in exchange for being able to select a more favorable wire type. The user may also decide if a different wire type is acceptable without adversely affecting the operation, if a first wire type is not available. Furthermore, the user does not require any technical know-how for making the optimum decision under certain conditions, as would be the case with the other known methods.

Preferably, the control device provides and/or partly or completely displays only those technological parameter sets wherein the global distance between the groups of input parameters and the respective current input parameters does not exceed a fixed or variable value. Consequently, unsuitable technological parameter sets are automatically excluded.

In another preferred embodiment, the control device calculates, at least approximately, additional values, such as the expected machining time and/or the expected machining cost and/or the expected number of required steps and/or the expected wire consumption, which arise with a machining operation when individual technological parameter sets are used. The control device displays the respective values. Preferably, the control device scales additional values which have been calculated at least approximately, in the same fashion as the input parameters and takes these additional values into account when calculating a global distance.

In this way, the user can advantageously even enter economic considerations into the final decision process.

In another preferred embodiment, the control device segregates technological parameter sets which include groups having the same global distance to the current input parameters, on the basis of additional criteria. This preferably takes place based on fixed or variable variations of local and/or global weighting in order to permit an unambiguous rating of the technological parameter sets.

In another preferred embodiment, the control device itself uses, for controlling the EDM machine, the output parameters of that technological parameter set which includes the group of input parameters with the smallest global distance from the current input parameters and/or from the additionally calculated values.

This method obviates the need for the user to make a decision. In contrast to the conventional method described above, a particular technological parameter set is here selected based on a total picture of all technological parameter sets which need to be considered. No selection takes place based on solitary decisions.

In another preferred embodiment, the control device provides the possibility for entering new technological parameter sets. The control device compares the new technological parameter sets with technological parameter sets stored previously and determines global distances between the respective groups of input parameters. If the global distances become zero, the respective technological parameter sets are segregated. Advantageously, the segregation is accomplished by fixed or variable variations of local and/or global weightings.

In this way, a user can apply his own know-how by using his own technological parameter sets. At the same time, conflicts arising from an uncontrolled expansion of an existing technological parameter set are prevented.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
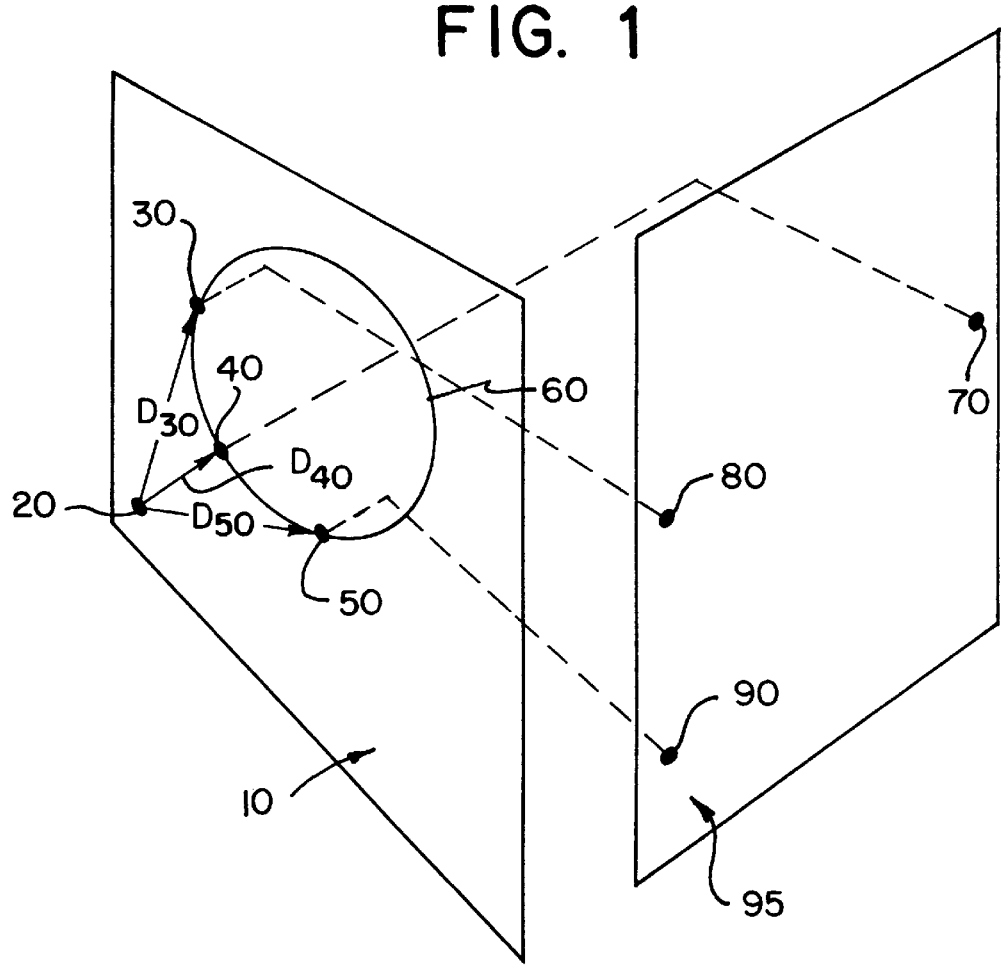
FIG. 1 is a schematic representation of the method according to the invention.
Figure 3:
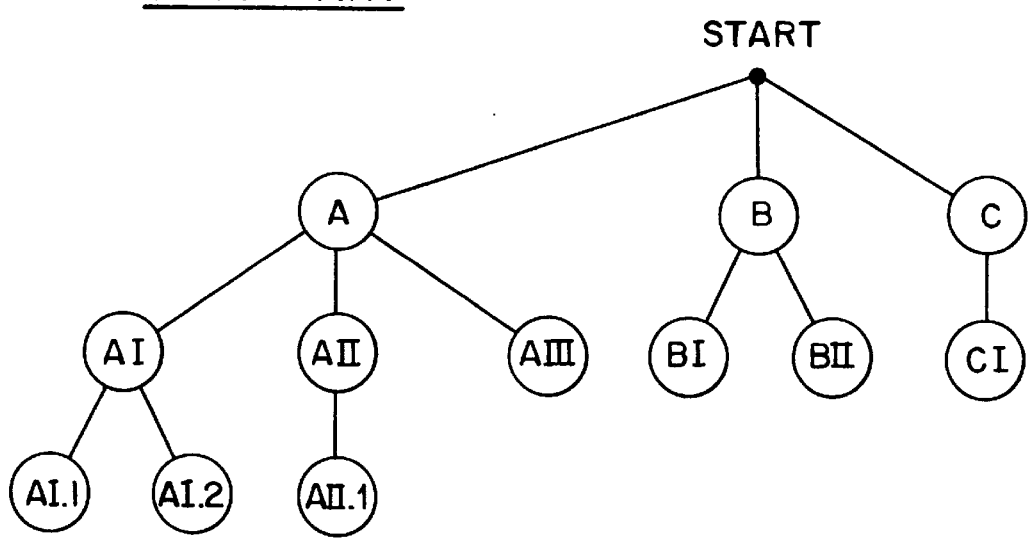
FIG. 3 a schematic representation of the method according to the present state of the art.

In FIG. 1, surface 10 represents the metric space of all possible input parameters, i.e. each point on this surface represents an entire group of input parameters 30, 40 and 50. Such a complete group consists of one each of the following input parameter types: machine type, workpiece material, workpiece height, wire material, wire diameter, roughness, flank tolerance and edge tolerance. The control device requests these eight input parameters from the user in an arbitrary order. If input parameters are not entered when selecting a technological parameter set, new input parameters may either be requested as an option or may simply be ignored.

The input parameters machine, workpiece material and wire material are entered with their name. The control device assigns to them places on discrete scales extending from 0 to 10. All the other parameters are entered in millimeters or micrometers, respectively. For example, a desired roughness may be entered in micrometers as an average deviation from an ideal smooth surface. The control device scales these input parameters logarithmically.

For each group of input parameters 30, 40, 50 there exists a one-to-one relationship to a group of output parameters 70, 80, 90. The metric space of all possible output parameters is represented by a plane 95. The correlation between one group of input parameters and a group of suitable output parameters forms a technological parameter set.

Figure 2:
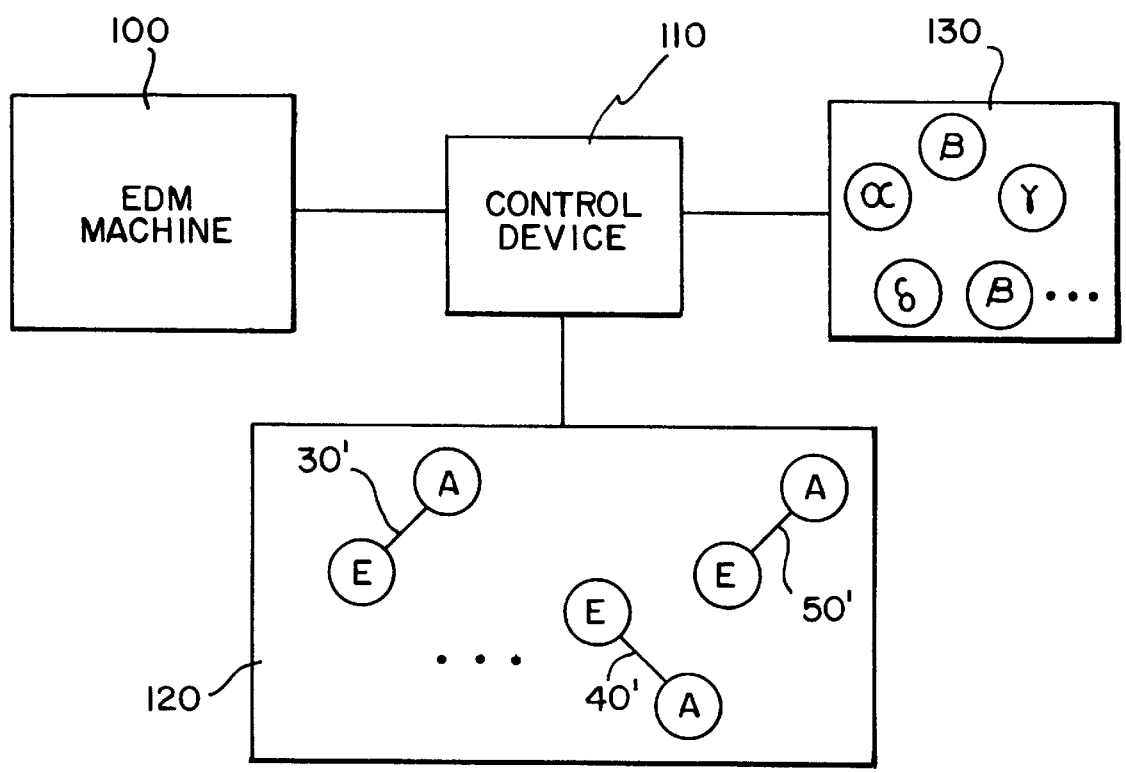
FIG. 2 is a schematic representation of an EDM machine suitable for the method according to the invention.

As shown in FIG. 2, the control device 110 has access to the memory 120. In the memory, there are stored different technological parameter sets 30', 40', 50'. Each technological parameter set consists of a group of input parameters E and a group of output parameters A.

After the user has finished entering input parameter 20 (as indicated in FIG. 1), the control device 110 compares the current input parameter 20 with the groups of input parameters 30, 40, 50 associated with the technological parameter sets 30', 40', 50'. For this purpose, the control device 110 places both the current input parameter 20 and the input parameters 30, 40, 50 of the same type which belong to the technological parameter sets, on the abovementioned scales. As for the input parameter types machine, workpiece material and wire material, these input parameters are assigned discrete integer places on the scale. In this way, differences in the machine type and material can be weighted.

The local distances $d_{local,lin}$ and $d_{local,log}$ are calculated according to the following relationships:

$$d_{local,lin}(X, Y) = \text{abs}[(X-Y)/(0.3*X)]$$

$$d_{local,log}(X, Y) = \text{abs}[\log(X/Y)]/\log(1.3).$$

As far as the technological parameter sets for individual input parameters include intervals instead of discrete values, local distances are calculated according to the following relationship:

$d_{local,lin}(X[a, b]) = 0$ for $X$ inside the interval $(a, b)$, and $d_{local,lin/log}(X, [a, b]) = \min[d_{local,lin/log}(Xa), d_{local,lin/log}(Xa, d_{local,lin/log}(Xb)]$ respectively.

It is always appropriate to specify such intervals for individual input parameters, if the corresponding output parameters are appropriate for all input parameters within this interval without appreciable loss in quality.

After the control device 110 has determined all local distances between the current input parameters and the input parameters from a group of input parameters of a technological parameter set, the control device 110 performs global weighting. For this purpose, there are stored in another memory or memory sector 130 weighting factors α, β, γ, δ, etc. Each of these weighting factors α, β, γ, δ belongs to an input parameter type. In general, it is possible that the control device 110 always relies on the same set of weighting factors. It is, however, also possible and may be advantageous that the user can adjust and change, respectively, the weighting factors to meet his requirements. This may be advantageous in the situation described below.

The user has in inventory about three types of wire with identical diameter. In order to have flexibility for using the inventory, a small weight is given to the wire type, i.e. a small weighting factor is selected. Consequently, the wire type plays a secondary role when the total distance is determined. This will be described below.

The weighting is accomplished in that the control device 110 multiplies a previously determined local distance with the respective associated global weighting factors α, β, γ, δ. Subsequently, the control device 110 adds the resulting weighted local distance to a total distance $D_{total}$.

This procedure is repeated by the control device 110 for all available technical parameter sets. The result is depicted in FIG. 1. There, a circle 60 on the plane 10 represents all technological parameter sets available to the control device 110. If, for example, the technological parameter sets with the input parameter groups 30, 40 and 50 are placed on the positions indicated on the circle 60, then the connecting lines D30, D40 and D50 represent the respective total distances $D_{total}$ to the set of actual input parameters 20. This makes sense, since the plane 10, as noted above, represents the metric space of the input parameters. Each group of input parameters 30, 40, 50 and of respective technical parameter sets 30', 40', 50' is linked to a group of output parameters 70, 80, 90.

After the total distances $D_{total}$ have been determined, the control device 110 outputs via an output device, for example a monitor, optionally one, several or all technological parameter sets sorted according to the magnitude of the respective total distance $D_{total}$. The output can also occur continuously while the individual technological parameter sets are checked. It is particularly advantageous if the control device first displays the technological parameter set whose group of input parameters has the smallest distance to the current input parameters. In FIG. 1, this is the case for the technological parameter set with the input parameter group 40. Next, the control device should display that technological parameter set having the next largest total distance $D_{total}$.

If the user has already entered other information, such as the desired cutting contours, etc., then the control device supplies additional information, such as the estimated machining time, the estimated machining cost, the number of required cuts and the wire consumption. If such data, however, are not available, then the control device can determine the additional information on the basis of trial contours or typical averaged values.

The user has the option to rely on such additional information, especially if the total distance $D_{total}$ does not depend strongly on individual technological parameter sets.

Alternately, for example, if the responsible operator is temporarily not available, then the control device may be able to automatically select the technological parameter set with the smallest total distance $D_{total}$ and use this smallest distance for operating the EDM machine.

With respect to the output format of suitable technological parameter sets, there exist other possibilities besides sorting. On one hand, the control device can output an arbitrarily preset number of optimum technological parameter sets. These would most likely be the technological parameter sets with the smallest total distance $D_{total}$. On the other hand, it would also be feasible to set a certain limit, i.e. a maximum total distance $D_{max}$. In this case, the control device could output all technological parameter sets having a smaller total distance. Both aforementioned possibilities could also be combined, i.e. the control device would output a certain number of optimum technological parameter sets, as long as their total distances $D_{total}$ are less than the limit $D_{max}$.

In all limit-setting operations, like during sorting of technological parameter sets with respect to the magnitude of the respective associated total distance $D_{total}$, there may arise conflicts if two or more total distances are identical. It is advisable to develop a strategy for dealing with such conflicts.

This can easily be implemented by varying, at a later time, one or more global weighting factors for the respective technological parameter sets or the associated groups of input parameters. This may either be performed automatically by the control device based on a defined given strategy; or, the control device may provide the user with the option to implement these modifications. The user is then able to check immediately the consequences arising from the change in priorities.

A brief example is intended to further illustrate the descriptions above. The objective is to determine suitable technological parameter sets for the following three input parameters:

Workpiece height 40 mm

Wire type CCD

Edge tolerance 6 μm

The global priority 2 shall be assigned to the workpiece height, i.e. local distances relating to the workpiece height are subsequently multiplied by the factor 2. Possible values in existing technological parameter sets are available for the workpiece heights of 30 mm, 35 mm, 50 mm and 70 mm. According to the relationship described above for local distances on logarithmic scales, the local distances 1, 10, 0.51, 0.85 and 2.13 result. These local distances are dimensionless quantities. Taking now global weighting into consideration, the weighted local distances 2, 20, 1.02, 1.70 and 4.26 result.

With respect to the wire material, to be weighted with a global priority of 8, the following values are possible: CCA, CCD, CCE, CCS. If these values are scaled accordingly, the following local distances result: 1, 0, 3, 2; or, after weighting with the global weighting factor 8, the distances 8, 0, 24, 16.

Finally, the edge tolerance has the global priority of 1. The possible values in this case shall be given in the form of intervals, i.e. the interval 2 to 5, interval 5 to 9, and the interval 9 to 14 μm. According to the relationship given above, the local distances 0.69, 0, 1.55 result. The weighting factor 1 does not affect these local distances.

It is assumed that 6 technological parameter sets are available comprising the aforedescribed input parameters according to the following table. The table begins with the technological parameter set with the smallest total distance $D_{total}$ and ends with the technological parameter set with the largest total distance $D_{total}$.

| Workpiece height (mm) | wire material (-) | edge tolerance (μm) | distance (-) |
|---|---|---|---|
| 35 | CCD | 5–9 | 1.02 |
| 50 | CCD | 2–5 | 2.39 |
| 70 | CCD | 5–9 | 4.26 |
| 30 | CCD | 9–14 | 3.74 |
| 50 | CCA | 5–9 | 9.70 |
| 35 | CCE | 2–5 | 25.7 |

The user is frequently interested in adding to the technical parameter sets supplied by the factory additional technical parameter sets based on the user's expertise. Generally, an input mode is provided for this purpose. As far as the method of the invention is concerned, such input, however, may result in conflicts. In the following, a strategy for solving such conflicts will be provided.

These conflicts always arise when the global distance between two technical parameter sets becomes zero. Technical parameter sets with these attributes may not always be distinguishable when the method of the invention is implemented; consequently, these technical parameter sets should be segregated when they are entered, through measures as described above, i.e. by varying the weighting factors.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for controlling an electroerosion machine for controllably cutting a workpiece comprising the steps of:
   a) providing a control device including technological parameter sets, each of which links a group of input parameters with suitable output parameters;
   b) comparing actual individual input parameters with similar parameters taken from a group of input parameters of said technological parameter sets for determining the degree of similarity between said actual input parameters and said parameters taken from said technological parameter sets;
   c) providing with the control device one or more technological parameter sets with groups of input parameters wherein the input parameters comprising any one of the groups are one of input parameters identical to the current input parameters and input parameters similar to current input parameters; and
   d) controlling said electroerosion machine based on one of the provided technological parameter sets with groups of input parameters.

2. The method according to claim 1, wherein the groups of input parameters within the individual technological parameter sets include at least one of a kind of machine, workpiece material, workpiece height, wire material, wire diameter, desired roughness, flank and edge tolerance.

3. The method according to claim 2, wherein the output parameters of the individual technological parameter sets include at least one of generator data, wire data and flushing data.

4. The method according to claim 1, wherein the control device assigns a scale to each input parameter.

5. The method according to claim 4, wherein the scale is linear for at least one of a kind of machine type, workpiece material and wire material.

6. The method according to claim 5, wherein the control device compares similar input parameters based on their position on the respective associated common scale and determines local distances on the respective associated scale; and takes position-dependent weighting into account for determining said local distances when position-dependent weighting is provided.

7. The method according to claim 4, wherein the scale is a logarithmic scale for at least one of workpiece height, wire diameter, roughness, flank tolerance and edge tolerance.

8. The method according to claim 7, wherein the control device determines a total distance $D_{total}$ by
   a) weighting one or more local distances;
   b) multiplying the local distances with global weighting factors associated with a respective input parameter; and
   c) adding the resulting distances which are weighted and/or remain unweighted.

9. The method according to claim 4, wherein the control device positions individual input parameters on a respective associated scale.

10. The method according to claim 4, wherein the control device determines local distances between any one of the actual input parameters X and one similar input parameter interval (a, b) out of a group of input parameters of one technological parameter set according to $d_{local,(a,\ b)}(X, (a, b))=0$ for X inside the interval (a, b); and $d_{local,(a,\ b)}(X, (a, b))=\min(d_{local,lin,log}(X,B))$ for X outside of (a, b).

11. The method according to claim 1, wherein the control device determines local distances between any one of the actual input parameters X and one similar input parameter Y from a group of input parameters of one technological parameter set with an associated linear scale according to $d_{local,lin}(X, Y)=C_i=$constant.

12. The method according to claim 11, wherein the control device scales additional values which have been calculated at least approximately in the same fashion as the input parameters and takes these additional values into account when calculating a global distance.

13. The method according to claim 1, wherein the control device compares a group of actual input parameters $\{X_i\}$ with a group of input parameters of a technological parameter set $\{Y_i\}$ by
   a) determining a total distance $D_{total}$;
   b) combining all local distances of any one of the input parameters of the group of actual input parameters with a similar input parameter out of the group of input parameters of the technological parameter set; and
   c) adding all local distances.

14. The method according to claim 1, wherein the control device displays at least partly via a display device and other output means, respectively, a fixed number or a variable number of technological parameter sets having input parameters which come closest to the respective actual input parameters.

15. The method according to claim 1, wherein the control device comprising any one of the groups of partial display and complete display of only those technological parameter sets wherein a global distance between the groups of input parameters and the respective actual input parameters does not exceed a fixed or variable value.

16. The method according to claim 1, wherein the control device calculates, at least approximately, additional values, such as an expected machining time and/or an expected machining cost and/or an expected number of required steps and/or an expected wire consumption, which arise with a machining operation when individual technological parameter sets are used, and the control device displays the respective values.

17. The method according to claim 1, wherein the control device
   a) segregates technological parameter sets which include groups having a same global distance to the actual input parameters, on the basis of additional criteria; and
   b) performs said segregation based on at least one of fixed and variable variations of local and global weighting.

18. The method according to claim 1, wherein the control device uses the output parameters of that technological parameter set which has the group of input parameters with at least one of a smallest global distance from the actual input parameters and from the additionally calculated values.

19. The method according to claim 1, wherein the control device is
   a) providing the possibility for entering new technological parameter sets;
   b) comparing the new technological parameter sets with technological parameter sets stored previously;
   c) determining global distances between the respective groups of input parameters;
   d) segregating the respective technological parameter sets if the global distances become zero; and
   e) segregating identically placed technological parameter sets by way of at least one of fixed, variable variations of local and global weightings.

20. The method according to claim 1, wherein the control device determines local distances between any one of the actual input parameter X and one similar input parameters Y from a group of input parameters of one technological parameter set with an associated linear scale according to $d_{local,lin}(X, Y) = abs((X-Y)/(0.3*X))$.

21. The method according to claim 1, wherein the control device determines local distances between any one of the actual input parameters X and one similar input parameter Y from a group of input parameters of one technological parameter set with an associated logarithmic scale according to $d_{local,lin}(X, Y) = abs(\log(X/Y)/\log(1.3))$.

* * * * *